US008493429B2

(12) United States Patent
Yan

(10) Patent No.: US 8,493,429 B2
(45) Date of Patent: Jul. 23, 2013

(54) METHOD AND TERMINAL FOR SYNCHRONOUSLY RECORDING SOUNDS AND IMAGES OF OPPOSITE ENDS BASED ON CIRCUIT DOMAIN VIDEO TELEPHONE

(75) Inventor: Xiaomei Yan, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 133 days.

(21) Appl. No.: 13/257,727

(22) PCT Filed: Dec. 7, 2009

(86) PCT No.: PCT/CN2009/075365
§ 371 (c)(1),
(2), (4) Date: Oct. 18, 2011

(87) PCT Pub. No.: WO2010/124499
PCT Pub. Date: Nov. 4, 2010

(65) Prior Publication Data
US 2012/0050451 A1    Mar. 1, 2012

(30) Foreign Application Priority Data
Apr. 27, 2009  (CN) .......................... 2009 1 0135589

(51) Int. Cl.
*H04N 7/14* (2006.01)
(52) U.S. Cl.
USPC .................. 348/14.02; 348/14.01; 348/14.12
(58) Field of Classification Search
CPC ....... H04N 7/14; H04N 7/147; H04N 21/4302; H04N 21/6131
USPC .................. 348/14.01–14.16; 370/260–261; 709/204
See application file for complete search history.

(56) References Cited

U.S. PATENT DOCUMENTS
2007/0053346 A1* 3/2007 Bettis et al. ................. 370/352
2008/0303888 A1* 12/2008 Hansson .................. 348/14.02

FOREIGN PATENT DOCUMENTS
| CN | 1859567 A | 11/2006 |
| CN | 1868213 A | 11/2006 |
| CN | 101036389 A | 9/2007 |
| CN | 101102485 A | 1/2008 |
| CN | 101102510 A | 1/2008 |
| CN | 101540871 A | 9/2009 |
| WO | 2008028361 A1 | 3/2008 |

OTHER PUBLICATIONS
International Search Report for PCT/CN2009/075365 dated Mar. 3, 2010.

* cited by examiner

*Primary Examiner* — Melur Ramakrishnaiah
(74) *Attorney, Agent, or Firm* — Stephe Yang; Ling Wu; Ling and Yang Intellectual Property

(57) ABSTRACT

A method and a terminal for synchronously recording voices and images of an opposite end based on a circuit domain videophone are provided. The method includes receiving, by a terminal used by a party in a video call, a recording instruction sent by a user, taking a local time as a reference time, and performing frame analyzing for received audio and video code-streams; and writing the audio and video frames obtained by analyzing and the duration corresponding to each frame into a 3GP file. The terminal includes an audio and video frame analysis module, an audio frame write-in module, a video frame write-in module and a frame duration calculation module. With the present invention, the user can experience that the time when the user starts the recording and the actual recording time are basically the same, thus the user satisfaction is improved.

12 Claims, 2 Drawing Sheets

METHOD AND TERMINAL FOR SYNCHRONOUSLY RECORDING SOUNDS AND IMAGES OF OPPOSITE ENDS BASED ON CIRCUIT DOMAIN VIDEO TELEPHONE

TECHNICAL FIELD

The present invention relates to the circuit domain based video call field, and more particularly, to a method and terminal for synchronously recording the voices and images of an opposite end based on a circuit domain videophone.

BACKGROUND OF THE INVENTION

With the development of computer technology and the 3$^{rd}$ Generation (3G), the processing capability of the computer device at the user end becomes more and more powerful, and the real-time transmission technology for transmitting video data through the mobile communication network is relatively mature now. The best use of 3G network is synchronous communication, and currently, both markets and technologies of the wireless videophone based on circuit domain transmission via the mobile network are relatively perfect. Videophone is an important application in 3 G communications, and 3G phone is at present an important terminal to implement this application. In a process of making a call via the videophone, to record audio and video streams including images and voices of the opposite end into a file of 3GP format is also a very important application. The 3GP format is a video file format generally supported by mobile terminals. It is specified in technology requirements for IP multimedia subsystem (IMS) terminal of China telecommunication that mobile terminals should support the encoding and decoding of audios and videos in 3GP format.

3$^{rd}$ Generation Partnership Project (3GPP) provides a solution for mobile videophone in which audios and videos are transmitted based on the circuit domain: 3G-324M protocol set. The 3G-324M protocol set includes H.324M protocol, H.223 multiplexing protocol, H245 control protocol, and audio and video encoding protocol, etc.

The 3GP standard is 3GPP 26244-720 standard made by the 3GPP organization, and the standard is based on ISO/IEC 041828_ISO_IEC__14496-12__2005 (E). Nowadays, most videophone videos are generated by recording the audio and video streams of the opposite ends according to the 3GP standard format into 3GP files and then playing back in players. As such, users can listen to the voices and watch the images of the opposite ends.

During a calling process of a videophone at present, both parties can watch in real time the video images of the opposite end captured by a camera, and meanwhile, can hear the audio voices of the opposite end captured by a microphone. When the mobile terminal records the watched video and listened audio into the 3GP file, it needs to start up audio write-in thread and video write-in thread in order not to affect the current effect of the video call. When the audio write-in thread processes the audio frames and the video write-in thread processes the video frames, the threads need to acquire system time of the cell phone. However, due to the thread priority and scheduling, the time acquired by these two threads might be inconsistent, as a result, the audio and video might be asynchronous, and the time difference between audio and video can be sometimes 1 second, 2~3 seconds or even more.

SUMMARY OF THE INVENTION

The present invention provides a method and a terminal for synchronously recording voices and images of an opposite end based on a circuit domain videophone to solve the problem that recording video and audio are not synchronous in the prior art.

In order to solve the above problem, the present invention provides a method for synchronously recording the voices and images of the opposite end based on the circuit domain videophone, and the method comprises steps of:

receiving, by a terminal used by a party in the video call, a recording instruction sent by a user, taking a local time as a reference time, and performing frame analyzing for received audio and video code-streams; and writing audio frames and video frames obtained by analyzing, as well as a duration corresponding to each frame, into a 3GP file; wherein, the duration of each of the audio or video frames except the first audio or video frame written into the 3GP file is respectively a difference between a relative time when the audio or video frame is obtained by analyzing and a relative time when a previous frame corresponding to the audio or video frame is obtained by analyzing, and the value of the relative time when each of the audio or video frames is obtained by analyzing is respectively a difference between a local time when the audio or video frame is obtained by analyzing and said reference time.

Furthermore, the above method may have the following feature:

the duration of the first audio frame written into the 3GP file is 20 ms, and the duration of the first video frame written into the 3GP file is ((N*8)/an actual network bandwidth occupied by the video)*1000 ms, wherein N is the number of bytes included in the video frame.

Furthermore, the above method may have the following feature:

the step of said terminal writing the video frames obtained by analyzing into the 3GP file comprises:

judging, by said terminal, each video frame obtained by analyzing in turn until a certain video frame is judged to be an I frame, and then starting to write a current video frame and subsequent video frames into the 3GP file;

the step of said terminal writing the audio frames obtained by analyzing into the 3GP file comprises:

before writing the first audio frame into the 3GP file, determining whether said terminal has already judged a certain video frame to be the I frame by then; if yes, writing a current audio frame and subsequent audio frames into the 3GP file, otherwise, continuing the determination operation.

Furthermore, the above method may have the following feature:

said terminal is configured with a flag bit; when said terminal judges a certain video frame to be the I frame, this flag bit is set; and before the audio frames are written in, whether the terminal has already judged a certain video frame to be the I frame is determined by determining whether the flag bit is set.

Furthermore, the above method may have the following feature:

after said terminal receives the recording instruction sent by the user, the method further comprises sending an I frame request to the opposite end.

Furthermore, the above method may have the following feature:

the value of the actual network bandwidth occupied by the video is 48 k bit rate or an empirical value.

Furthermore, the above method may have the following feature:

said party in the video call is a calling user and/or a called user.

Furthermore, the above method may further comprise:

after said terminal receives a stop recording command sent by the user, stopping analyzing the audio and video streams and closing the 3GP file.

In order to solve the above problem, the present invention further provides a terminal for synchronously recording the voices and images of the opposite end based on the circuit domain videophone, and the terminal comprises an audio and video frame analysis module, an audio frame write-in module, a video frame write-in module, and a frame duration calculation module;

said audio and video frame analysis module is configured to receive a recording instruction sent by a user, send a start timing command to said frame duration calculation module, and perform frame analyzing for received audio and video code-streams; and further configured to record a local time when each audio or video frame is obtained by analyzing and send the local time to said frame duration calculation module;

said audio frame write-in module is configured to write the audio frames obtained by the analyzing by said audio and video frame analysis module and a duration corresponding to each audio frame into a 3GP file;

said video frame write-in module is configured to write the video frames obtained by the analyzing by said audio and video frame analysis module and a duration corresponding to each video frame into the 3GP file; and said frame duration calculation module is configured to take the local time as a reference time when receiving said start timing command; and further configured to calculate the duration of each of the audio or video frames except the first audio or video frame written into the 3GP file and send the calculated duration to the audio or video frame write-in module corresponding to the audio or video frame, wherein the value of the duration is respectively a difference between a relative time when each of the audio or video frames is obtained by analyzing and a relative time when a previous frame corresponding to the audio or video frame is obtained by analyzing, and the value of the relative time when each of the audio or video frames is obtained by analyzing is respectively a difference between a local time when the audio or video frame is obtained by analyzing and said reference time.

Furthermore, the above terminal may have the following feature:

the duration of the first audio frame written into the 3GP file is 20 ms, and the duration of the first video frame written into the 3GP file is ((N*8)/an actual network bandwidth occupied by the video)*1000 ms, wherein N is the number of bytes included in the video frame.

Furthermore, the above terminal may have the following feature:

said video frame write-in module is further configured to judge each of the video frames obtained by analyzing in turn until a certain video frame is judged to be an I frame, and then start to write a current video frame and subsequent video frames into the 3GP file; and said audio frame write-in module is further configured to determine whether said video frame write-in module has already judged a certain video frame to be the I frame before writing the first audio frame into the 3GP file; if yes, write a current audio frame and subsequent audio frames into the 3GP file, otherwise, continue the determination operation.

Adopting the present invention, the images and voices of the opposite end can be synchronously recorded during a call by a videophone; meanwhile, since recording is not started until the I frame of the video is received, the situation of blurred screen in the first several seconds at the beginning of recording caused by playing P frames can be avoided; the I frame request is sent to the opposite end at the beginning of recording, such that the opposite end can send the I frame to this end in time, so as to avoid discarding many P frames after starting the recording and to make the user experience that the time when the user starts the recording and the actual recording time are basically the same, thus to improve the user satisfactory.

PREFERRED EMBODIMENTS OF THE PRESENT INVENTION

Figure 1:
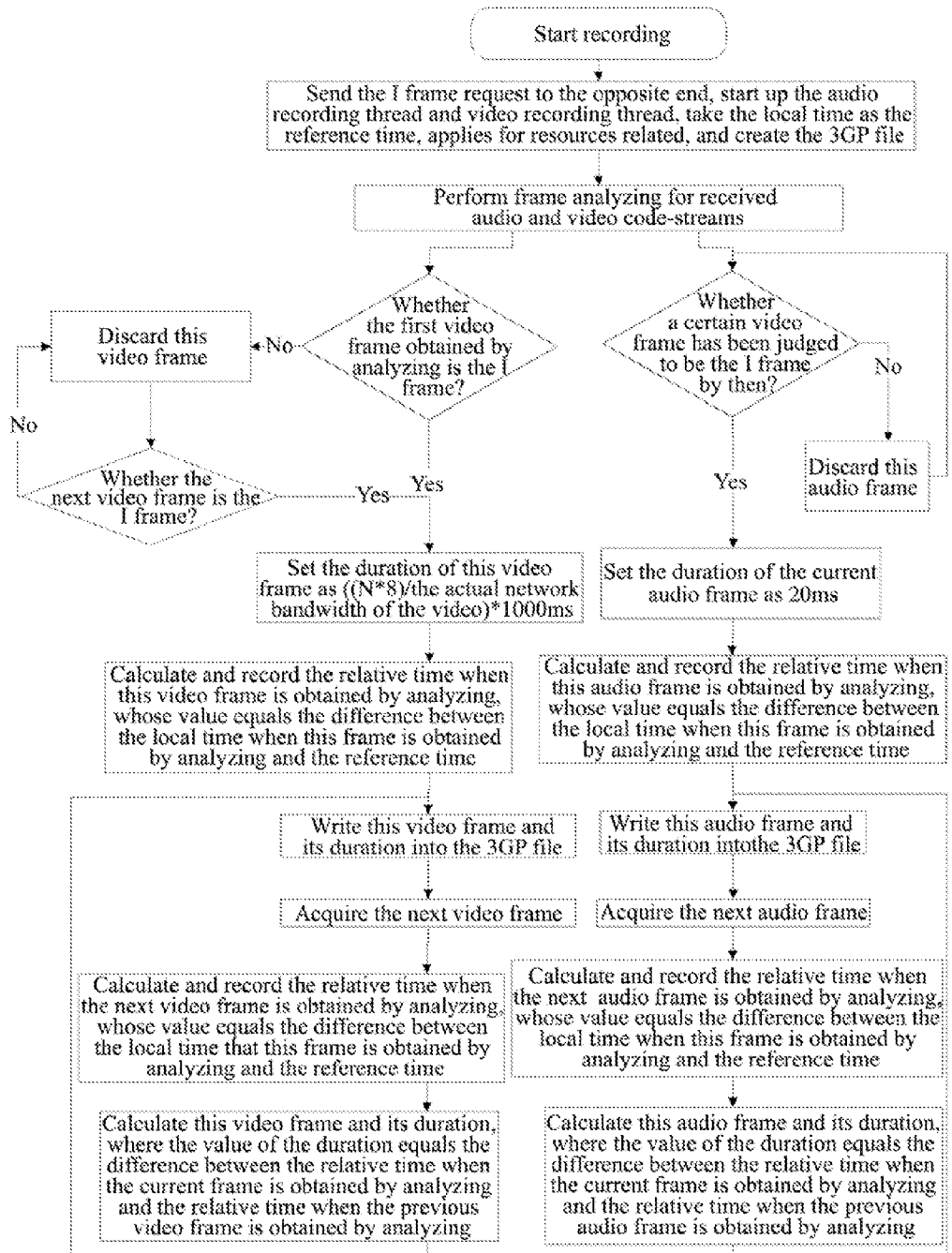
FIG. 1 is a flow chart of synchronously recording audio and video via a videophone in accordance with an embodiment of the present invention.

The technical scheme of the present invention will be described in detail below in conjunction with the drawings and embodiments.

The basic idea of the present invention is: a terminal used by a party (calling user and/or called user) in a video call receives a recording instruction sent by a user, then takes a local time as a reference time and perform frame analyzing for received audio and video code-streams; and then the audio frames and video frames obtained by analyzing, as well as the duration corresponding to each frame, are written into a 3GP file; wherein, the duration of the first audio frame written into the 3GP file may be 20 ms, the duration of the first video frame written into the 3GP file may be ((N*8)/the actual network bandwidth occupied by the video)*1000 ms, where N is the number of bytes included in the video frame, and the duration of each of the rest audio or video frames is a difference between a relative time when this frame is obtained by analyzing and a relative time when the previous corresponding frame is obtained by analyzing, where the value of the relative time when each frame is obtained by analyzing is a difference between a local time when this frame is obtained by analyzing and the above reference time.

The circuit domain videophone is 64 k bit rate and the bandwidth assigned to the video is generally 48 k bit rate. Therefore, the value of the above actual network bandwidth occupied by the video can take 48 k bit rate or an empirical value (such as 35 k bit rate).

In order to guarantee that there is no blurred screen caused by playing P frame during the first several seconds of the recording, each video frame obtained by analyzing may be judged in turn until a certain video frame is judged to be I frame, and then the current video frame and the subsequent video frames are written into the 3GP file. Correspondingly, it is determined whether this terminal has already judged a certain video frame to be the I frame before writing the first audio frame obtained by analyzing into the 3GP file; if yes, the current audio frame and the subsequent audio frames are written into the 3GP file, otherwise, perform the above determination operation for the next audio frame.

A flag bit can be configured in this terminal. When this terminal determines that a certain video frame is the I frame, this flag bit is set; and before writing audio frames in, it is determined whether this terminal has already judged a certain video frame to be the I frame by judging whether this flag bit is set.

In order to avoid discarding many P frames after starting recording, the terminal may also send an I frame request after receiving the recording instruction sent by the user, so as to make the opposite end send I frames to this end as soon as possible, thereby reducing the amount of P frames discarded.

In addition, after the terminal receives a stop recording command sent by the user, the terminal stops analyzing the audio and video streams, closes the 3GP file, and ends the recording process.

Figure 2:
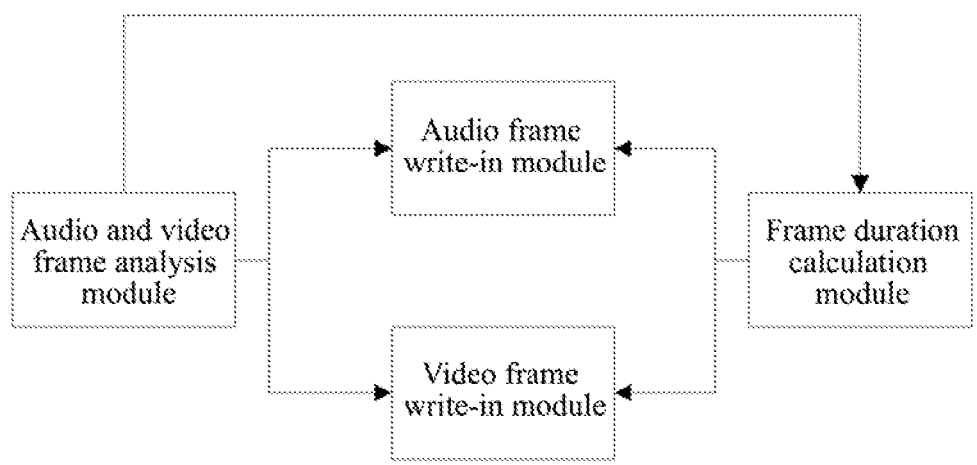
FIG. 2 is a structure of the terminal for synchronously recording the voices and images of an opposite end in accordance with an embodiment of the present invention.

A terminal for synchronously recording voices and images of the opposite end based on the circuit domain videophone, as shown in FIG. 2, includes an audio and video frame analysis module, an audio frame write-in module, a video frame write-in module, and a frame duration calculation module.

The audio and video frame analysis module is configured to receive a recording instruction sent by the user, send a timing command to the frame duration calculation module, and start to perform frame analyzing for the received audio and video code-streams; and also configured to record the local time when each audio or video frame is obtained by analyzing and send the local time to the frame duration calculation module.

The audio frame write-in module is configured to write the audio frames obtained by the analyzing by the audio and video frame analysis module and the duration corresponding to each audio frame into the 3GP file.

The video frame write-in module is configured to write the video frames obtained by the analyzing by the audio and video frame analysis module and the duration corresponding to each video frame into the 3GP file.

The frame duration calculation module is configured to take the local time as the reference time when receiving the start timing command; and also configured to calculate the duration of each of the audio or video frames other than the first audio or video frame written into the 3GP file, and send the calculated duration of each frame to the corresponding frame write-in module, wherein the value of the duration is the difference between the relative time when this frame is obtained by analyzing and the relative time when the previous corresponding frame is obtained by analyzing, where the value of the relative time when each frame is obtained by analyzing is the difference between the local time when this frame is obtained by analyzing and the reference time. Wherein, the duration of the first audio frame written into the 3GP file is 20 ms, and the duration of the first video frame written into the 3GP file is ((N*8)/the actual network bandwidth occupied by the video)*1000 ms, where N is the number of bytes included in this video frame.

Specifically, the video frame write-in module is configured to judge each video frame obtained by analysis in turn until a certain video frame is judged to be I frame, and then start to write the current video frame and the subsequent video frames into the 3GP file; and the audio frame write-in module is configured to determine whether the video frame write-in module has already judged a certain video frame to be the I frame before writing the first audio frame obtained by analyzing in, if yes, write the current audio frame and the subsequent audio frames into the 3GP file, otherwise, perform the above determination operation for the next audio frame.

An application example of the present invention will be further described in the following.

FIG. 1 is a flow chart of the synchronous process of recording audio and video via a videophone in accordance with the present invention, and the specific steps of the method of the present invention will be described in detail below with reference to FIG. 2, wherein:

Step 1, during a video call between the calling and called parties using videophones, when a videophone 1 of either party receives a recording command sent by the user, the videophone 1 sends an I frame request to the a videophone 2 of the opposite end, starts up an audio write-in thread and video write-in thread, takes the local time as a reference time, applies for resources related, and creates a 3GP file;

Step 2, perform frame analyzing for received audio and video code-streams; to express clearly, the video write-in process and the audio write-in process will be described respectively in the following.

The video write-in process includes the following steps:

Step A1, the video write-in thread judges whether the first video frame obtained by analyzing is the I frame, if yes, proceeds to the next step; otherwise, discards this video frame, and continues to judge whether the next video frame is the I frame, and then proceeds to the next step when a certain video frame is judged to be the I frame;

Step A2, set the value of the duration of this video frame is as ((N*8)/the actual network bandwidth occupied by the video)*1000 ms, where N is the number of bytes included in this video frame;

Step A3, calculate and record the relative time when this video frame is obtained by analyzing, whose value equals the difference between the local time when this frame is obtained by analyzing and the reference time;

Step A4, write this video frame and its corresponding duration into the 3GP file;

Step A5, calculate and record the relative time when the next video frame is obtained by analyzing, whose value equals the difference between the local time when this frame is obtained by analyzing and the reference time;

Step A6, calculate the duration of this video frame, whose value equals the difference between the relative time when the current frame is obtained by analyzing and the relative time when the previous video frame is obtained by analyzing, and then proceed to step A4.

The audio write-in process includes the following steps:

Step B1, the audio write-in thread determines whether the video write-in thread has already judged a certain video frame to be the I frame before writing the first audio frame obtained by analyzing in, if yes, proceeds to the next step; otherwise, discards this audio frame, and repeats the above determination and corresponding discarding operation before writing the next audio frame in till it is determined that the video write-in thread has already judged a certain video frame to be the I frame, and then proceeds to the next step;

Step B2, set the value of the duration of the audio frame as 20 ms;

Step B3, calculate and record the relative time when this audio frame is obtained by analyzing, whose value equals the difference between the local time when this frame is obtained by analyzing and the reference time;

Step B4, write this audio frame and its corresponding duration into the 3GP file;

Step B5, calculate and record the relative time when the next audio frame is obtained by analyzing, whose value equals the difference between the local time when this frame is obtained by analyzing and the reference time;

Step B6, calculate the duration of this audio frame, whose value equals to the difference between the relative time when the current frame is obtained by analyzing and the relative time when the previous audio frame is obtained by analyzing, and then proceed to step B4.

Of course, the present invention may have many other embodiments. Those skilled in the art may make various modifications and variations according to the present invention without departing from the spirit and essence of the present invention, and all these modifications and variations shall belong to the scope of the appended claims of the present invention.

INDUSTRIAL APPLICABILITY

With the present invention, a user can synchronously record the images and voices of the opposite end during a call by a videophone; meanwhile, since the recording is not started until the I frame of the video is received, the situation of blurred screen in the first several seconds at the beginning of recording caused by playing the P frames can be avoided; the I frame request is sent to the opposite end at the beginning of recording, such that the opposite end can send the I frame to this end in time, so as to avoid discarding many P frames after starting the recording and to let the user experience that the time when the user starts the recording and the actual recording time are basically the same, which improves the user satisfactory.

What we claim is:

1. A method for synchronously recording voices and images of an opposite end based on a circuit domain videophone, comprising steps of:

receiving, by a terminal used by a party in a video call, a recording instruction sent by a user, taking a local time as a reference time, and performing frame analyzing for received audio and video code-streams; and writing audio frames and video frames obtained by analyzing, as well as a duration corresponding to each frame, into a 3GP file; wherein, the duration of each of the audio or video frames except the first audio or video frame written into the 3GP file is respectively a difference between a relative time when the audio or video frame is obtained by analyzing and d relative time when a previous frame corresponding to the audio or video frame is obtained by analyzing, and the value of the relative time when each of the audio or video frames is obtained by analyzing is respectively a difference between a local time when the audio or video frame is obtained by analyzing and said reference time.

2. The method of claim 1, wherein,
the duration of the first audio frame written into the 3GP file is 20 ms, and the duration of the first video frame written into the 3GP file is ((N*8)/an actual network bandwidth occupied by the video)*1000 ms, wherein N is the number of bytes included in the video frame.

3. The method of claim 1, wherein,
the step of writing the video frames obtained by analyzing into the 3GP file comprises:
judging, by said terminal, each video frame obtained by analyzing in turn until a certain video frame is judged to be an I frame, and then starting to write a current video frame and subsequent video frames into the 3GP file;
the step of writing the audio frames obtained by analyzing into the 3GP file comprises:
before writing the first audio frame into the 3GP file, determining whether said terminal has already judged a certain video frame to be the I frame by then; if yes, writing a current audio frame and subsequent audio frames into the 3GP file, otherwise, continuing the determination operation.

4. The method of claim 3, wherein,
said terminal is configured with a flag bit;
the step of judging, by said terminal, each video frame obtained by analyzing in turn comprises setting the flag bit when said terminal judges a certain video frame to be the I frame; and
the step of determining whether said terminal has already judged a certain video frame to be the I frame by then comprises determining whether the flag bit is set.

5. The method of claim 3, wherein, after said terminal receives the recording instruction sent by the user, said method further comprises sending an I frame request to the opposite end.

6. The method of claim 2, wherein,
the value of the actual network bandwidth occupied by the video is 48 k bit rate or an empirical value.

7. The method of claim 1, wherein,
said party in the video call is a calling user and/or a called user.

8. A method of claim 1, further comprising:
after said terminal receives a stop recording command sent by the user, stopping analyzing the audio and video streams and closing the 3GP file.

9. A terminal for synchronously recording voices and images of an opposite end based on a circuit domain videophone, comprising an audio and video frame analysis module, an audio frame write-in module, a video frame write-in module, and a frame duration calculation module, wherein, said audio and video frame analysis module is configured to receive a recording instruction sent by a user, send a start timing command to said frame duration calculation module, and perform frame analyzing for received audio and video code-streams; and further configured to record a local time when each audio or video frame is obtained by analyzing and send the local time to said frame duration calculation module;

said audio frame write-in module is configured to write the audio frames obtained by the analyzing by said audio and video frame analysis module and a duration corresponding to each audio frame into a 3GP file;

said video frame write-in module is configured to write the video frames obtained by the analyzing by said audio and video frame analysis module and a duration corresponding to each video frame into the 3GP file; and said frame duration calculation module is configured to take the local time as a reference time when receiving said start timing command; and further configured to calculate the duration of each of the audio or video frames except the first audio or video frame written into the 3GP file, and send the calculated duration to the audio or video frame write-in module corresponding to the audio or video frame, wherein the value of the duration is respectively a difference between a relative time when each of the audio or video frames is obtained by analyzing and a relative time when a previous frame corresponding to the audio or video frame is obtained by analyzing, and the value of the relative time when each of the audio or video frames is obtained by analyzing is respectively a difference between a local time when the audio or video frame is obtained by analyzing and said reference time.

10. The terminal of claim 9, wherein,
the duration of the first audio frame written into the 3GP file is 20 ms, and the duration of the first video frame written into the 3GP file is ((N*8)/an actual network bandwidth occupied by the video)*1000 ms, wherein N is the number of bytes included in the video frame.

11. The terminal of claim 9, wherein,
said video frame write-in module is further configured to judge each of the video frames obtained by analyzing in turn until a certain video frame is judged to be an I frame, and then start to write a current video frame and subsequent video frames into the 3GP file; and
said audio frame write-in module is further configured to determine whether said video frame write-in module has already judged a certain video frame to be the I frame before writing the first audio frame into the 3GP file; if yes, write a current audio frame and subsequent audio frames into the 3GP file, otherwise, continue the determination operation.

12. The method of claim 4, wherein, after said terminal receives the recording instruction sent by the user, said method further comprises sending an I frame request to the opposite end.

* * * * *